United States Patent Office 3,743,484
Patented July 3, 1973

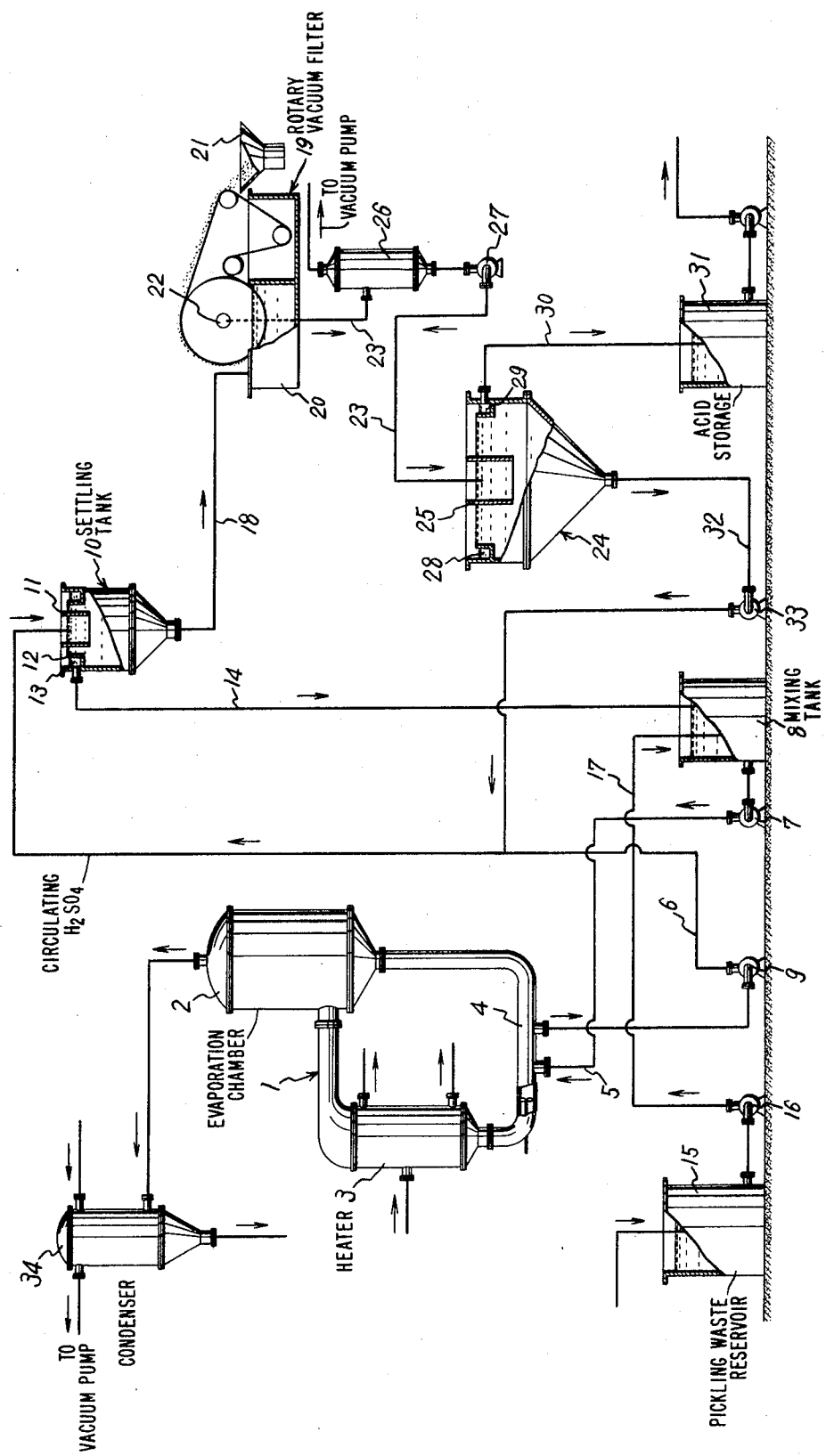

3,743,484
REGENERATION OF SULFURIC ACID PICKLING WASTE
Yasuo Morimoto, Osaka, Japan, assignor to Daido Chemical Engineering Corporation, Osaka-shi, Japan
Filed Nov. 10, 1970, Ser. No. 88,403
Claims priority, application Japan, Dec. 30, 1969, 45/109
Int. Cl. B01d 1/00, 1/30, 9/00
U.S. Cl. 23—306                                     4 Claims

ABSTRACT OF THE DISCLOSURE

Sulphuric acid pickling waste is regenerated by mixing it with circulating sulphuric acid. The resultant liquid mixture is heated prior to concentration in a vacuum evaporator to obtain sulfuric acid of a concentration of 40 to 55% by weight and ferrous sulfate monohydrate crystals dispersed therein in a slurry concentration of 10 to 30% by weight. Finally the sulfuric acid is separated from the ferrous sulfate monohydrate crystals for recovery, and part of the recovered sulfuric acid is circulated.

---

The present invention relates to regeneration of sulfuric acid pickling waste, more particularly to a novel method and an apparatus for continuously recovering sulfuric acid from a sulfuric acid pickling waste by heat concentration.

Generally, sulfuric acid has heretofore been used widely for pickling iron and steel materials. Sulfuric acid pickling waste, effluent from the pickling operation, usually contains 5 to 15% by weight of sulfuric acid and 10 to 18% by weight of ferrous sulfate, and if it is disposed of as such, loss of resources and pollution of rivers will result. Regeneration of the pickling waste is therefore necessary.

Most generally, the regeneration of sulfuric acid pickling waste has so far been carried out by heat concentration. In accordance with the heat concentration method, the sulfuric acid pickling waste is directly concentrated to a concentration of 40 to 55% by weight, whereby a slurry containing crystallized ferrous sulfate monohydrate in a concentration of above 30% by weight is obtained, and by filtration sulfuric acid and ferrous sulfate monohydrate are separated for recovery. With such conventional method, however, the ferrous sulfate crystals precipitated include a great amount of fine crystals, so that it is impossible for usual filter means such as a rotary vacuum filter to completely filter out these crystals, thus permitting part of the crystals to pass through the filter fabric into recovered sulfuric acid. In fact, it is noted that, in accordance with the conventional method, more than 30% by weight of the ferrous sulfate monohydrate crystals are fine crystals which pass through a 200-mesh sieve, particularly through a 250-mesh sieve, about ½ to ⅕ thereof being those passing through a 300-mesh sieve which it is impossible to filter out. Consequently, fine ferrous sulfate monohydrate crystals which have passed through the filter fabric will eventually be included in the recovered sulfuric acid, deteriorating pickling efficiency and blocking pipes and other arrangements of apparatuses when it is reused for pickling operation. In an attempt to remove such undesired fine crystals, the concentrated slurry may presumably be filtered by a special filter, but this requires an expensive apparatus and complicated procedures.

An object of this invention is to provide a method and an apparatus for recovering, from sulfuric acid pickling waste and by heat concentration, sulfuric acid which is almost free of ferrous sulfate monohydrate crystals and which is therefore capable of effecting satisfactory pickling operation without any noticeable deterioration in efficiency.

Another object of the present invention is to provide a method and an apparatus for recovering high purity sulfuric acid from a sulfuric acid pickling waste by heat concentration without requiring a special filtering apparatus and complicated procedures for filtration.

These and other objects of this invention will become more apparent from the following detailed description.

The present method for treating a sulfuric acid pickling waste comprises steps of:

(1) Mixing a sulfuric acid pickling waste with circulating sulfuric acid which is obtained from a subsequent step and has a free sulfuric acid concentration of 40 to 55% by weight, (2) Heating the resultant liquid mixture for concentration in a vacuum evaporator to obtain sulfuric acid of a concentration of 40 to 55% by weight and ferrous sulfate monohydrate crystals dispersed therein in a slurry concentration of 10 to 30% by weight.

(3) Separating the sulfuric acid from the ferrous sulfate monohydrate crystals for recovery, and (4) Circulating part of the recovered sulfuric acid.

As a result of the studies conducted by the present inventor it has been found that whereas the direct concentration of a sulfuric acid pickling waste in accordance with the known method produces a considerable amount of fine crystals which are difficult or impossible to filter out, the addition of circulating sulfuric acid obtained in a subsequent step to the sulfuric acid pickling waste so as to obtain, when the mixture is concentrated, a sulfuric acid concentration of 40 to 55% by weight and a slurry concentration of 10 to 30% by weight markedly reduces the amount of fine ferrous sulfatemonohydrate crystals which are difficult or impossible to filter out, with the result that almost all of the crystals produced which are sufficiently coarse and do not pass through a 200-mesh sieve can be readily separated by filtration.

Accordingly, it is possible to recover sulfuric acid having a high purity which is almost free of ferrous sulfate monohydrate crystals to be otherwise contained as impurities. In addition, the crystals obtained, being coarse, can be readily separated by usual filtering means without a necessity to employ an expensive apparatus or complicated filtration procedure. In contrast, where the sulfuric acid pickling waste is directly concentrated by the conventional method to obtain a sulfuric acid concentration of 50% by weight and a slurry concentration of 40% by weight, the result achieved is that coarse crystals which are sufficiently large and do not pass through a 200-mesh sieve account for only 59.2% by weight. Another 23.6 percent portion of the crystals are smaller but do not pass through a 250-mesh sieve. The rest of the crystals, i.e. 17.2% by weight thereof, are so fine as to pass through the 250-mesh sieve and can not be separated by filtration. On the other hand, where the sulfuric acid pickling waste is mixed with the circulating sulfuric acid and the mixture is concentrated to obtain a sulfuric acid concentration of 40% by weight and a slurry concentration of 10% by weight in accordance with this invention, the resultant ferrous sulfate monohydrate crystals contained in the slurry are found to be of very large sizes. Indeed, 98.2% by weight of the crystals obtained are sufficiently coarse and do not pass through a 200-mesh sieve, with the rest of the crystals, i.e. 1.8% by weight thereof, being smaller but of such sizes that they do not pass through a 250-mesh sieve.

In the present invention, it is required that a sulfuric acid pickling waste be mixed with circulating sulfuric acid from subsequent step which has a sulfuric acid concentration of 40 to 55% by weight. Although the proportion of the circulating sulfuric acid to the sulfuric acid pickling waste to be mixed therewith is variable in a wide range depending upon the sulfuric acid concentration and ferrous sulfate concentration of the pickling waste and the sulfuric acid concentration of the circulating sulfuric acid, the porportion must be such that when the mixture is concentrated to a sulfuric acid concentration of 40 to 55% by weight, the resultant slurry of ferrous sulfate monohydrate crystals has a slurry concentration of 10 to 30% by weight. Particularly, it is desired to effect the concentration to such extent as to achieve a sulfuric acid concentration of 45 to 50% by weight and a slurry concentration of 10 to 15% by weight. That is to say, the sulfuric acid pickling waste, if directly concentrated to a sulfuric acid concentration of 40 to 55% by weight, will give a slurry of precipitated crystals whose concentration is well above 30% by weight, producing fine crystals which are difficult or impossible to filter out.

Usually the weight ratio of the circulating sulfuric acid to the amount of sulfuric acid pickling waste to be treated is 0.01:1 to 1.65:1, a suitable ratio being determined depending upon the composition of the sulfuric acid pickling waste to be treated. The conditions for concentrating the mixture are nearly the same as those of the conventional method, and the heat concentration may preferably be carried out in a vacuum evaporator at a pressure of about 700 mm. Hg below atmospheric pressure.

For a better understanding of the advantages of this invention, the present method, as practiced on an illustrated apparatus, will be described below.

A vacuum evaporator 1 of external heating type is provided with an evaporation chamber 2 whose lower end is connected to the lower end of a heater 3 by a liquid circulating pipe 4 and whose top is communicated to a condenser 34 connected to a vacuum pump (not shown). An intermediate portion of the pipe 4 is connected to a line 5 for supplying a liquid to be fed into the evaporator 1. The pipe 4 is further connected, also at its intermediate portion, to a line 6 for discharging a concentrated liquid from the evaporator 1. The extreme end of the line 5 is connected, by way of a pump 7, to a mixture tank 8. The extreme end of the line 6 is connected to a means for separating the concentrated liquid into sulfuric acid and ferrous sulfate monohydrate crystals. A rotary vacuum filter may generally be used as the separating means. In this case, all the concentrated liquid may be treated directly by such filter, or alternatively, the concentrated liquid may first be separated in a settling tank into a supernatant liquid and a concentrated slurry by settling, and only the concentrated slurry obtained may be thereafter treated by the filter. In accordance with this invention both methods are employable. With the latter method, the amount of the liquid to be filtered is smaller than with the former, hence advantageous in that a filter of a smaller capacity can be used. Moreover, the supernatant liquid of the settling tank can be employed as it is as circulating sulfuric acid. The drawing shows an apparatus employing the latter method. Thus, the extreme end of the line 6 is connected to a settling tank 10 by way of a pump 9. The settling tank 10 is provided with a baffle plate 11 for preventing turbulence of the liquid at the surface therof and an overflow barrier 12 disposed at the upper end of the side wall, a liquid chamber 13 defined by the overflow barrier 12 and the inner wall of the tank 10 communicating with the mixture tank 8 by means of a discharge pipe 14. The mixture tank 8 is connected to a sulfuric acid pickling waste reservoir 15 by a line 17 having a pump 16. By way of a line 18, the bottom end of the settling tank 10 is connected to a tank 20 for a rotary vacuum filter 19. Crystals separated by the filter 19 are recovered through a hopper 21 into a storage tank (not shown). On the other hand, sulfuric acid is recovered at a liquid chamber 22 of the filter 19. Since almost all crystals have been separated from the sulfuric acid, the sulfuric acid may be used satisfactorily for pickling operation as it is, but where it is desired to obtain an acid of a higher purity, the sulfuric acid thus recovered may further be introduced into a crystal-growing tank to effect growth of a small amount of fine crystals contained therein, whereupon the crystals are allowed to settle and separated to obtain pure sulfuric acid. The embodiment shown is an example of the apparatus for carrying out such operation, wherein the sulfuric acid separated by the filter 19 is sent from the liquid chamber 22 of the filter 19 into a crystal-growing tank 24 through a line 23. The line 23 connecting the chamber 22 to the tank 24 is provided with a filtrate tank 26 subjected to a reduced pressure by a vacuum pump (not shown) and a pump 27. The crystal-growing tank 24 has a baffle plate 25 for eliminating turbulence at the liquid surface and a overflow barrier 28 disposed at the upper end thereof, a liquid chamber 29 defined by the overflow barrier 28 and the inner wall of the tank 24 communicating with a tank 31 for storing recovered acid through a line 30. The crystal-growing tank 24 is provided, at its bottom, with a line 32 for taking out grown crystals whose distal end is connected, by way of a pump 33 to an intermediate portion of the line 6 so as to filter out the grown crystals again which get settled at the bottom of the crystal-growing tank 24. In the case where the crysctal-growing tank 24 is not employed, the line 23 may be connected to the tank 31 for the recovered acid.

The present invention will now be described as it is practiced using the above apparatus. By way of the line 17 with the pump 16, a sulfuric acid pickling waste containing 10% by weight of $H_2SO_4$ and 15% by weight $FeSO_4$ is supplied from the reservoir 15 into the tank 8 at a rate of 1000 kg./hr., while circulating sulfuric acid containing 50% by weight of $H_2SO_4$ and 1% by weight of $FeSO_4$ is sent out from the settling tank 10 into the tank 8 at a rate of 1500 kg./hr., wherein two liquids are mixed. Even if the circulating sulfuric acid contains a small amount of fine ferrous sulfate monohydrate crystals they will be dissolved in the sulfuric acid pickling waste, whereby the adverse effect of such fine crystals on the growth of ferrous sulfate monohydrate crystals newly formed is eliminated. The mixture in the tank 8 is then introduced into the circulation pipe 4 of the vacuum evaporator 1 by means of the line 5 with the pump 7 and is passed through the heater 3, evaporation chamber 2 and the liquid circulation pipe 4 at about 700 mm. Hg below atmospheric pressure while thereby being subjected to heat concentration. During this step, water is evaporated off at a rate of 635 kg./hr. and ferrous sulfate monohydrate crystals are precipitated to obtain a slurry containing 10% by weight of ferrous sulfate monohydrate crystals dispersed in 50% by weight sulfuric acid. Through the line 6 with the pump 9, this slurry is fed into the settling tank 10 at a rate of 1900 kg./hr. While allowing the crystals to settle, the supernatant liquid is caused to flow over the overflow barrier 12, through the discharge pipe 14 and into the tank 8 at a rate of 1500 kg./hr. for admixture with a sulfuric acid pickling waste. At a rate of about 400 kg./hr., the concentrated slurry of ferrous sulfate crystals is taken out from the tank and is supplied through the line 18 into the liquid chamber 20 of the vacuum filter 19, where the crystals are separated from the sulfuric acid. As a result, ferrous sulfate monohydrate crystals are recovered from the hopper 21 at a rate of about 200 kg./hr., and the sulfuric acid is recovered from the line 23, at a rate of about 165 kg./hr. The recovered sulfuric acid contains only about 0.5 to 1.0% by weight of ferrous sulfate monohydrate crystals, which insures effective reuse for pickling operation. In order to further improve the purity, the sulfuric acid thus recoverd is introduced through the line 23 into the crystal growing tank 24, where it is left to stand for 10 to 30 hours, for example, for 20 hours. The supernatant liquid is then led through the line 30 into the tank 31 at a rate of 165 kg./hr. to recover high purity sulfuric acid which contains only about 0.1 to 0.3% by weight of ferrous sulfate monohydrate crystals. On the other hand, the grown crystals settled in the tank 24 are returned through the line 32 to the line 6 together with a portion of the sulfuric acid for further treatment in the settling tank 10.

What I claim is:
1. A method for regenerating a sulfuric acid pickling waste comprises steps of:
   (1) mixing in a mixture tank a sulfuric acid pickling waste with circulating sulfuric acid which is obtained from a subsequent step and has a free sulfuric acid concentration of 40 to 50% by weight,
   (2) introducing the resultant liquid mixture into a vacuum evaporator,
   (3) heating said liquid mixture for concentration in the heater of said vacuum evaporator to obtain sulfuric acid of a greater concentration of 40 to 55% by weight and ferrous sulfate monohydrate crystals dispersed therein in a slurry concentration of 10 to 30% by weight,
   (4) separating the sulfuric acid from the ferrous sulfate monohydrate crystals for recovery, and
   (5) recirculating part of the recovered sulfuric acid to step (1) for mixing with sulfuric acid pickling waste.

2. The method as set forth in claim 1 wherein the concentration of said liquid mixture is effected while maintaining sulfuric acid concentration of 45 to 55% by weight and a concentration of slurry of ferrous sulfate monohydrate of 10 to 15% by weight in the evaporator.

3. The method as set forth in claim 1 wherein said separation of the sulfuric acid from the ferrous sulfate monohydrate crystals is effected in a settling tank so as to separate a supernatant liquid from settled ferrous sulfate monohydrate crystals, the supernatant liquid thereafter being circulated for admixture with said sulfuric acid pickling waste, a slurry concentrated by the settling of the crystals in the settling tank further being separated into sulfuric acid and ferrous sulfate monohydrate crystals for recovery.

4. The method as set forth in claim 3 wherein said separation of the sulfuric acid and the ferrous sulfate monohydrate crystals is carried out by filtration, said sulfuric acid being left to stand to allow the crystals to grow in a crystal-growing tank and to recover an overflow liquid therefrom, a lower layer containing ferrous sulfate monohydrate crystals settled at the bottom of said crystal-growing tank being returned to said settling tank.

References Cited
UNITED STATES PATENTS

| | | | |
|---|---|---|---|
| 2,078,088 | 4/1937 | Mantius et al. | 23—306 |
| 2,184,419 | 12/1939 | Fowler et al. | 23—126 |
| 2,721,562 | 10/1955 | Irvine | 23—172 X |
| 2,960,391 | 11/1960 | Sweet et al. | 23—305 X |
| 3,018,166 | 1/1962 | Powell, Jr. | 23—126 |

NORMAN YUDKOFF, Primary Examiner

J. SOFER, Assistant Examiner

U.S. Cl. X.R.

159—45; 423—141, 531